(No Model.)
A. L. G. DEHNE.
PURIFYING FEED WATER.
No. 344,085. Patented June 22, 1886.
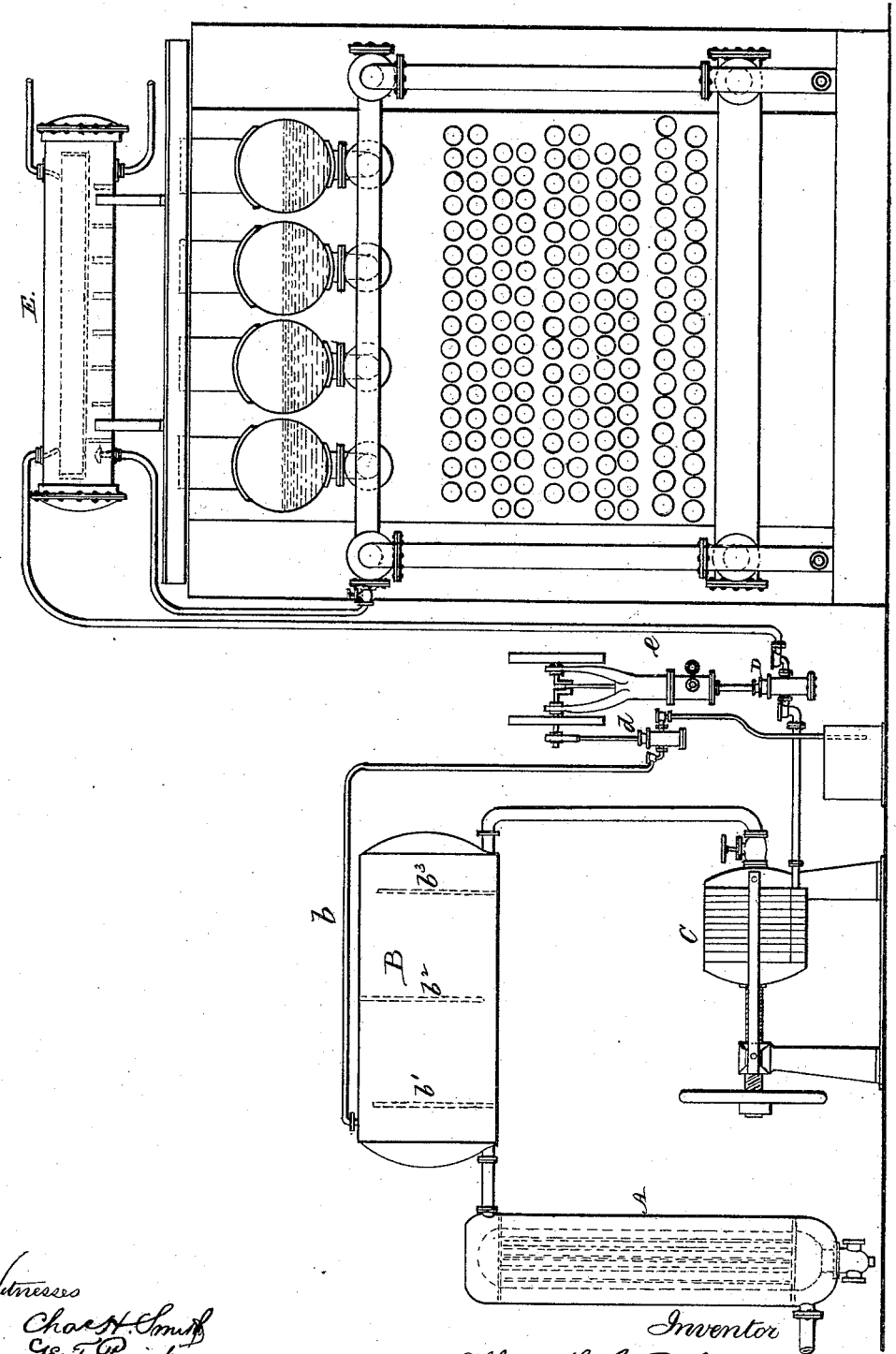

UNITED STATES PATENT OFFICE.

ALBERT LUDWIG GEORG DEHNE, OF HALLE-ON-SAALE, PRUSSIA, GERMANY.

PURIFYING FEED-WATER.

SPECIFICATION forming part of Letters Patent No. 344,085, dated June 22, 1886.

Application filed May 18, 1885. Serial No. 165,788. (No model.)

*To all whom it may concern:*

Be it known that I, ALBERT LUDWIG GEORG DEHNE, of Halle-on-Saale, Kingdom of Prussia, German Empire, engineer, have invented certain new and useful Improvements in Purifying Feed-Water, of which the following is a specification.

Water that is supplied to steam - boilers often contains impurities that are deposited in the boiler and produce a scale that is very detrimental.

My present improvement relates to heating the feed-water and mixing with the same chemical materials that will deposit the impurities, and then the water is filtered to retain the deposit, and any remaining impurities are allowed to subside before reaching the boiler.

In the drawing, my invention is illustrated by an elevation, partly in section. I first supply the water into a preheater, A, by the pressure from any suitable head or by any pumping device. This preheater is used in cases where preheated water is not at disposal for feeding the boiler. In this preheater the water may be heated up to 70° centigrade or 158° Fahrenheit and more, and it thereafter enters into the closed reservoir B. This reservoir is provided with partitions shown by dotted lines at $b'$ $b^2$ $b^3$, and is of such dimensions that the water may freely circulate through the same. Besides the water I feed into the reservoir B, by means of a second supply-pipe, $b$, a proper solution of chemicals, such as will cause a precipitation of the matters or solutions contained in the water. According to the quality of the feed-water the chemicals or chemical compounds may be chosen; and in order that the feed of such chemical compounds may always bear a standard ratio in proportion to the quantity of the feed-water, I either employ a pump, $d$, or a feed apparatus especially constructed for this purpose, and I cause this pump or apparatus to be moved together with the boiler-feed pump D, so that the chemicals or chemical compound or compounds and the feed-water are always passed into and through the reservoir B in a determined or fixed proportion. The chemicals or chemical compounds will, by acting for a certain period in the reservoir B upon the matters contained in the feed-water, cause the formation of precipitates. For instance, if soda is employed, carbonates will be precipitated. The water passes from the reservoir B into a filter - press, C, in which the water is filtered, and in which the precipitates will accumulate. The filtered water will then be passed to the boiler-feed pump D, either directly or by means of a reservoir from which the pump draws the water. The filter-press may be emptied from time to time and be provided with fresh filtering material—such as cloth, &c. The filter-press may be provided with such channels or pipings for entrance of the water from the reservoir B and outlet of the filtered water as to introduce such filter-press within a closed conduct of pipes; or more than one filter-press may be employed, and they may be arranged with proper pipings and valves, so as to use the one while the other is being cleaned. The mass of precipitates are retained in the filter-press C and in the reservoir B, the latter for this reason being also provided with openings and hand-holes, for easy cleansing. The partition-walls may also be movable. The water thus purified and filtered is now pumped through the pipe $e$ into the boiler; but before entering the same it passes through a collector, E, supplied with steam, for the purpose of bringing the water into intimate contact with the steam while in an interior open gutter. (Shown by dotted lines.) In this gutter the water is heated, and any earthy matters contained in the water are retained by a layer of cokes or iron chips, or any other suitable material placed in the said gutter. This collector and heater, with its gutter, is so constructed that it may easily be opened, by removing one of the heads or otherwise, and cleaned when the boiler is not at work. The feed-water passes from this gutter into the boiler in a perfectly clean condition.

I claim as my invention—

1. The method herein specified of purifying and supplying feed-water to steam - boilers, consisting in passing the water through a closed vessel in which heat is applied to the water, mixing with said water chemical substances in a second closed vessel, and allowing portions of the impurities to subside therein, drawing the water by a pump through a filter-press to further separate the impurities, and simultaneously pumping the feed-water to the boiler and the proper proportion of chemical substances into the water in the mixing-vessel, so as to maintain a uniformity of action in separating the impurities, substantially as specified.

2. The method herein specified of purifying and supplying feed-water to steam-boilers, consisting in passing the water through a closed vessel in which heat is applied to the water, mixing with said water chemical substances in a second closed vessel and allowing portions of the impurities to subside therein, drawing the water by a pump through a filter-press to further separate the impurities, and simultaneously pumping the feed-water to the boiler and the proper proportion of chemical substances into the water in the mixing-vessel, so as to maintain a uniformity of action in separating the impurities, and exposing the water in a closed vessel to the action of steam to further heat the same, and to the filtering action of coke or similar material to remove any remaining impurities, substantially as specified.

In testimony that I claim the foregoing as my invention I have signed my name in presence of two subscribing witnesses.

ALBERT LUDWIG GEORG DEHNE.

Witnesses:
WILHELM WIESENHUTTER,
GEORG RICHTER.